United States Patent

Skinner

[15] 3,650,046
[45] Mar. 21, 1972

[54] EDUCATIONAL DEVICE WITH SELF-CHECKING ARRANGEMENT

[72] Inventor: Burrhus F. Skinner, Cambridge, Mass.
[73] Assignee: Meredith Corporation
[22] Filed: Nov. 10, 1969
[21] Appl. No.: 875,057

Related U.S. Application Data

[63] Continuation-in-part of Ser. No. 638,071, May, 1967, abandoned, and a continuation-in-part of Ser. No. 815,803, Apr., 1969, abandoned.

[52] U.S. Cl. ............................................................ 35/91 G
[51] Int. Cl. ............................................................ G09b 3/02
[58] Field of Search ............................... 35/9; 401/208, 267

[56] References Cited

UNITED STATES PATENTS

| | | | |
|---|---|---|---|
| 549,098 | 11/1895 | Baldwin | 401/267 |
| 798,888 | 9/1905 | DuBrau | 401/208 |
| 1,884,197 | 10/1932 | Peterson et al. | 35/9 |

*Primary Examiner*—Wm. H. Grieb
*Attorney*—Molinaire, Allegretti, Newitt & Witcoff

[57] ABSTRACT

Educational devices such as workbooks and the like for instructing students include s sheet visibly printed with (a) information or intelligence to which response must be made on the part of the student, and (b) a designated area or series of areas in which the student may give a response or be provided with additional information or "hints" of the correct answer. The student provides a response in the designated area or areas with a first type of writing instrument. The correct answer or further instructions or intelligence for the student are printed in invisible ink in the designated area or areas. The answer or additional information becomes visible upon contact of the area by the student with a developing composition. The writing instrument used by the student with a developing composition. The writing instrument used by the student to write his visible response and the developing composition are both selected so that if the invisible ink is developed prior to the time that the student writes his own response with the writing instrument, his visible marking will have a different appearance than it does when it is made prior to applying the developing composition. Because the sequence of writing and developing can be readily distinguished, the teacher reviewing the student's test paper, workbook, practice sheet, etc. can ascertain at a glance whether an invisible ink area was developed before or after the student wrote his response.

With this method both the student's response and the invisible response must occupy the same area if the order effect is to reveal unauthorized use of the invisible information. It may not be too easy for the student to read the correct response when it has become visible because the two responses overlap. This defect can be remedied if the two responses occupy different but adjacent areas. To prevent the student from developing the correct response before writing his own, he may be required to apply the developing solution in such a way that it leaves a single pattern when applied in one operation, but a visibly overlapping, broken, or disjointed pattern when applied in two or more operations. This can be achieved by using a patterned stamp, roller, or shading pen.

23 Claims, 8 Drawing Figures

PATENTED MAR 21 1972     3,650,046

1. John drove away in a *black* car.

2. 1 + 2 = [3]

3. 16X = 48
   X = [3]

4. [car]

8. John drove away in a _____ car.

9. John drove away in a *black* car.

10. John drove away in a ~~black~~ car.

11. John drove away in a ~~BLACK~~ car.

12. John drove away in a ~~BLACK~~ car.

Inventor:
Burrhus F. Skinner
By Bair, Freeman & Molinare
Attys.

Fig. 3.

5. ½ × ¾ = | HINT #1: NOT 4/6 | HINT #2: ?/8 | ANSWER: 3/8 |

6. America was discovered by | HINT: C.C_____S | ANSWER: COLUMBUS |

7. Il y a sept jours dans une | ANSWER: semaine | HINT: days |

Fig. 4.

13. ½ × ¾ = | HINT #1: [ ] | HINT #2: [ ] | [ ] |

14. ½ × ¾ = | HINT #1: NOT 4/6 | HINT #2: [ ] | [ ] |

15. ½ × ¾ = | HINT #1: NOT 4/6 | HINT #2: ?/8 | [ ] |

16. ½ × ¾ = | HINT #1: NOT 4/6 | HINT #2: ?/8 | 3/8 |

17. ½ × ¾ = | HINT #1: NOT 4/6 | HINT #2: ?/8 | 3̶/8̶/8 |

Inventor:
Burrhus F. Skinner
By Bair, Freeman & Molinare
Attys.

Inventor:
Burrhus F. Skinner

EDUCATIONAL DEVICE WITH SELF-CHECKING ARRANGEMENT

CROSS REFERENCE TO RELATED APPLICATION

This is a continuation-in-part of U.S. application Ser. No. 638,071, filed May 12, 1967 and U.S. application Ser. No. 815,803 filed Apr. 14, 1969 both now abandoned.

BACKGROUND OF THE INVENTION

This invention relates to educational devices such as workbooks of the type utilizing invisible printing to provide an improved teaching tool, and, more particularly, to a teaching device which permits the teacher to ascertain whether the student had access to a correct answer or additional information or intelligence printed in invisible ink prior to writing his own visible response on the worksheet.

In U.S. Pat. Nos. 3,363,336; 3,363,337 and 3,363,338 all issued Dec. 1, 1967, my coinventors and I proposed a method and device for teaching a student writing skills, which calls for the use of worksheets on which correctly formed letters are printed in invisible ink. The student then practices letter formation by writing over designated areas, in which areas are printed the correctly formed letters in invisible ink. The writing instrument of the student contains a developing agent for the invisible printed ink. When the student marks over the invisible ink, the ink becomes visible in a color different from the color applied by the writing instrument to the untreated worksheet. Thus, it is possible for the student to ascertain whether he has correctly formed the letter and where any deviation has occurred.

Besides teaching writing skills, it has also been proposed to utilize invisible ink printing and a developing composition in combination for the purpose of objective type tests. This was taught in Adams, U.S. Pat. No. 2,618,866. Thus, for example, a question may be printed in visible ink and a multiplicity of choices for an answer may be provided. Invisible ink can then be provided in a response area adjacent the correct answer. Failure to activate the invisible ink will result in an immediate indication of an incorrect response.

Coming now to the problem solved by the present disclosure, a very common kind of instructional material consists of a workbook, or similar grouping of pages of material, in which the student is asked to write a response. The student must then compare his response with a correct response printed elsewhere. The correct response is to be concealed while the student writes his own. For example, it may be on the next page, or on a page referred to by number, or underneath a movable cover, or located in a numbered list at the end of the workbook. Under these conditions there is no way to prevent the student from looking at the right response before making his own, except by direct supervision, which is inconvenient and costly.

So far as I am aware, there is no teaching in the prior art which permits a student to check his responses for correctness and which, at the same time, provides an indication to the teacher whether the correct response was made by the student before the student revealed the correct response.

SUMMARY OF THE INVENTION

In a principal aspect the present invention comprises a teaching device in which a developing composition is used by the student to render visible an invisible correct response or further information relating to a question or statement requiring completion. The developing composition also provides an indication whether the student's writing instrument was scribed over the developing composition or applied to the worksheet prior to application of the developing composition. As a further feature of the invention, multiple invisible ink areas may provide further information. The student need not utilize these additional areas, but he will leave a record of his use. In each instance the student may respond in the area or areas provided whereupon the student will be given an indication of the correctness of his response or further information to assist him in arriving at a correct response or both. The last area only in a series for a single question will provide the answer. Of course, each of the multiple ink areas will also incorporate the feature of the invention whereby the student leaves an indication of the order in which he developed the invisible ink and supplied his response. As still a further feature of the invention, a physical means is provided whereby the order of development of the ink can be determined.

BRIEF DESCRIPTION OF THE DRAWINGS

Other objects and advantages of the invention will become apparent from the following description when read in conjunction with the accompanying drawings in which:

FIG. 3 shows a worksheet with additional illustrative embodiments of the invention;

FIG. 4 shows the worksheet with a sequence of steps for an example set forth in FIG. 3;

DESCRIPTION OF THE PREFERRED EMBODIMENTS

In teaching the language arts and other verbal knowledge, incomplete sentences, incomplete words, a partial illustration or similar information is printed visibly on the worksheet as indicated at 1. The area in which the student writes his response is defined by the space between the words, that is, the underlined area in the illustration. Printed in this area in invisible ink is the correct response to the question or control image. The invisible ink printing is illustrated by the broken lines forming the word "black."

The student first writes his response in the designated area with a crayon, for example, which marks a fluorescent yellow on the white sheet which is preferably paper. The student's writing is illustrated by the thin line cursive writing. To determine whether his response is correct the student then swabs the area above the line with a fluid developing composition which may conveniently be stored in a spongy pad mounted in a receptacle on the top of the writing instrument. The developing composition causes the invisible ink to develop as a dark image. The developing composition also contains a dye which may be red in color. However, the developing composition does not wet the sheet where the waxy crayon cursive writing has been applied. It only dyes and develops the invisible ink areas not covered by the crayon marking. Thus, the student's written response appears in yellow on a red background and the correct printed response appears in a dark color, such as black, through the coating formed on the paper by the red dye. The dark color is of sufficient intensity clearly to show through the red color.

Suppose the student, contrary to instructions, sought to determine the correct response by swabbing the surface with developer to render visible the word "black" before he writes his answer. If he then writes his answer with the yellow crayon over the developed and red area, the marks will appear in orange color, not yellow fluorescent, and will be only faintly visible. This is in marked contrast to the bright yellow fluorescent mark made directly on the sheet prior to development and prior to application of the dye. Hence, it is apparent at a glance that the development of the correct answer occurred before the student wrote his response. If the student experimentally attempts partial development to give him a clue as to the correct answer, this will be apparent because his response must be written in that specific area where the invisible image has been printed and will coincide with the developing material applied to the sheet.

Figures 1, 2:
FIG. 1 shows a work book sheet with various illustrative embodiments of the invention.
FIG. 2 shows a worksheet with a sequence of steps of an example set forth in FIG. 1.

FIG. 2, examples 8 through 12, shows the sequence of operations. The student sees the presentation at 8. He fills in the blank with his writing instrument as in 9. He then treats the same area with the developing material, as in 10. The correct answer is produced in the same area as his written answer but in contrasting color so that both are legible. If the student attempts to reveal the correct answer before writing his answer and develops it first, as in 11, the writing instrument then will not write in this area or will write in such a way as to leave a clearly different color or type of mark, as in 12. The teacher is then able to determine whether the student revealed the correct answer before or after writing his own response by noting whether the completed material resembles 10 or 12.

The invisible ink may be prepared from various compositions which react with other chemicals to form a dark color. Suitable compositions are disclosed in my issued patents referred to previously. As an example, the invisible ink may have the following composition:

| Ingredient | Parts by Weight Quantity of the Ingredient |
| --- | --- |
| Propylgallate | 1.75 |
| 2,4-dihydroxy-benzophenone | 1.75 |
| Polyvinylpyrrolidone | 1.3 |
| Isobutyl alcohol | 95.2 |

The developing agent for this ink formulation contains an iron salt which reacts with the gallate to produce a dark image on the paper. A preferred composition for the developing agent containing red dye is as follows:

| Ingredient | Parts by Weight |
| --- | --- |
| Ferric ammonium sulfate | 7.9 |
| Propylene glycol | 30.0 |
| Wetting agent (Triton X-100) | 0.5 |
| Dyestuff (red) | 0.8 |
| Water | 61.6 |

This developing agent may be used to saturate a sponge in a holder fixed to the end of the crayon or it may be separately supplied. When it comes in contact with the gallate, a black image is immediately developed and a red color is applied over the surface which has been treated. Many other pairs of chemicals are known which upon contact produce a visible image from an invisible one.

There are also other means for producing telltale marks made subsequent to development of the latent printed image. For example, the writing instrument such as a "felt" pen may contain a water soluble ink and the developing solution may contain a wax which prevents the paper from taking a mark where the wax film has been deposited. An example of such a developer follows:

| Ingredient | Parts by Weight |
| --- | --- |
| Ferric Octoate | 4.0 |
| Mineral spirits | 66.0 |
| Water | 18.0 |
| Paraffin wax | 12.0 |

Here again the iron octoate reacts with the gallate of the invisible ink to produce a very black mark on the paper. Simultaneously with the developing, a film of paraffin wax is deposited over the paper and this prevents the ink from wetting or making a continuous visible mark on the film. Any suitable material which leaves a "greasy" deposit will be satisfactory, such as Japan wax, bleached beeswax, synthetic waxes or even long chain fatty acids such as stearic, palmitic, myristic acids.

The teaching device of the invention may be used for instruction in other fields such as mathematics (see examples 2 and 3 of the drawing) and elementary English as indicated by example 4. In this latter example, the area for student's response is marked with brackets printed in visible ink. In each instance it will be noted that the area for the student's response must be defined. This restricts the student's response to the area of the invisible printing so that predevelopment can always be ascertained. Writing outside the designated area would be contrary to specific instructions and predevelopment would be implied. Also note that in examples 3 and 4 that the student's response is not indicated.

Referring now to FIG. 3, there is shown an additional embodiment of the invention. In this embodiment more than one area is provided for the student to receive additional information or indicate his chosen answers. Thus in FIG. 3, a worksheet is provided having three questions, 5, 6 and 7. Related with each question are at least two areas. These areas are provided for response or to provide additional information relating to the question associated with those areas. More than two areas for a student's response may be utilized as shown in example 5. In any event, there is provided an area for ultimate response, said area including the correct answer.

In each of the examples of FIG. 3, the physical arrangement of invisible ink and developing composition is as previously described. Namely, the worksheet includes discrete areas in which the student is to make his response. In these areas there is provided information printed with invisible ink. This information may be the answer to a question or it may be a "clue" or hint of the correct answer. In the examples wherein hints are available are indicated to the student. The answer areas are also indicated.

When answering a question, a student will leave a record of the hints he required since the hints become available only upon activation of the invisible ink. As before the student will also provide an indication of the sequence in which he provided his answer in the last square and determined the correctness of his answer. Advantageously this arrangement utilizing hints or additional areas of information permits those students who understand the lesson to omit using the hints whereas those who need additional help have it readily available. In this manner a single lesson can be made suitable to a wide range of abilities among students.

For example, if an invisible word translation is provided in example 7 for each word beneath each word, a student can choose the hints he will need to properly answer or complete the sentence in French. In this manner, the teacher not only knows how advanced a student may be, but the teacher will be able to determine what specific trouble spots the individual student may have. Examination of the student's paper may reveal a pattern of problems with verbs. The teacher can then provide some verb drills for that individual student. At the same time, the student is receiving his regular lesson in conjunction with the rest of the class by means of the teaching device of the type shown in example 7.

The above described arrangement of the areas is merely illustrative. Numerous other possibilities can be provided. Importantly, however, each discrete area prior to the last area includes an indication or correctness of the answer or a hint or clue of the final answer. The final area includes the answer. As can be readily appreciated, the possible embodiments of this invention are limited only by the imagination of the designer of the questionnaire.

How the student may get help in finding a response, while leaving a record showing that he has done so, is shown in FIG. 4, examples 13 through 17. The student sees 13. If he can solve the problem, he writes the answer in the answer box on the right and develops the area to check the answer as above. If, however, he is in doubt and needs help, he develops material in the box labeled Hint No. 1, as shown in 14. He learns that 4/6 is not the right answer. If this clears up his doubt so that he can now give the answer, he writes it in the box on the right and develops the correct answer as before. If he feels he needs still further help, he develops the material in the box marked Hint No. 2, as in 15. He learns that what is wanted is a fraction with 8 in the denominator. He must now try to give the right answer, which he writes in the box on the right, as in 16. He develops this area as shown in 17, revealing the correct response. The teacher knows from the fact that the two hint boxes have or have not been developed how much help the student needed to get the right answer.

Figure 5:
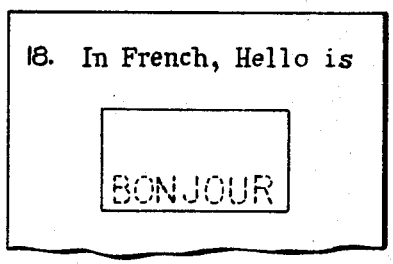
FIG. 5 shows still another embodiment of the invention.
Figure 6:
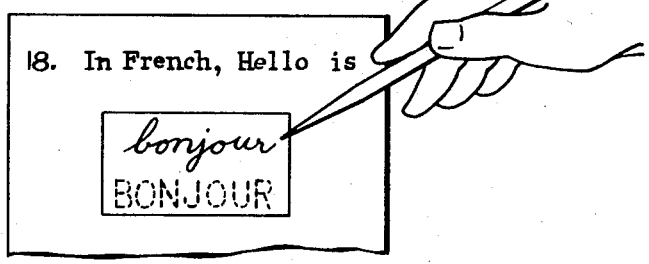
FIGS. 6 and 7 show the worksheet of FIG. 5 following a sequence of steps by a student.
Figure 7:
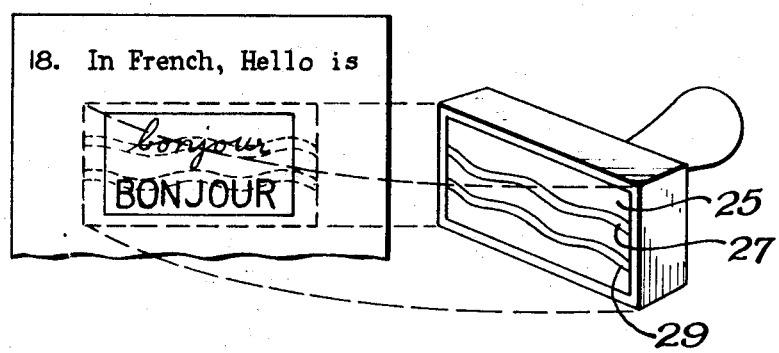

Referring now to associated FIGS. 5, 6 and 7, there is still another embodiment of the invention which provides a self-checking arrangement by means of the cooperative relationship between invisible printing, a student's response, and an application of the developing agent for the invisible printing which leaves a distinctive pattern in a single application which can be duplicated only with great difficulty, if at all, with two partial applications. FIG. 5 illustrates a typical worksheet with a question No. 18 as it would appear to a student before any type of response has been given. The upper part is the area in which the student is to scribe his response. Denoted by the dotted lines is the invisible ink answer "Bonjour".

Turning now to FIG. 6, the student by means of the writing instrument as illustrated in the Figure has inserted his answer or written response in the appropriate area indicated on the worksheet. Of course, the materials for the examples set forth in FIGS. 5 through 7 for the visible and invisible printing and activation of the invisible printing may be the same as those discussed in detail heretofore.

FIG. 7 then illustrates a developing means applicator which in this case is a stamp, for example a rubber stamp, designed to apply developing composition to the entire area denoted by the outline in which the student places his written response and which also includes the invisible printed answer. The stamp may print a distinctive pattern of varying intensities of color in addition to applying the developing agent. Or as specifically illustrated, the stamp may include a stamp pad 25 having a continuous groove or channel 27. Thus, when the developing composition is applied to the invisibly inked area, at least one contrasting visible, undeveloped segment is provided in the area in which the student has provided his written response or in which the invisible printing is provided. In other words, if the area in which the student provides his written response and in which the invisible printing is provided are distinct, then the stamp will provide at least one contrasting visible segment through these areas.

To obtain an indication of the correct answer before making his response, the student would have to apply the stamp first only to the portion of the area in which the invisible printing is provided, then write his response, then apply his stamp to the remaining area. This is virtually impossible without leaving a tell-tale overlay, a break, or a discontinuity in the pattern. It would then be clear that the student had looked at the concealed answer before constructing his own answer.

As illustrated in FIG. 7, more than one continuous contrasting segment may be provided, for example, a second segment 29 could be provided. The segments 27 and 29 then need not necessarily be continuous since two segments provide a spatial or geometric relationship once they are applied to the required area. To properly place a stamp pad, for example, on the area of the worksheet and duplicate positioning of the pad to achieve the correct spatial relationship is also a virtual impossibility.

Figure 8:
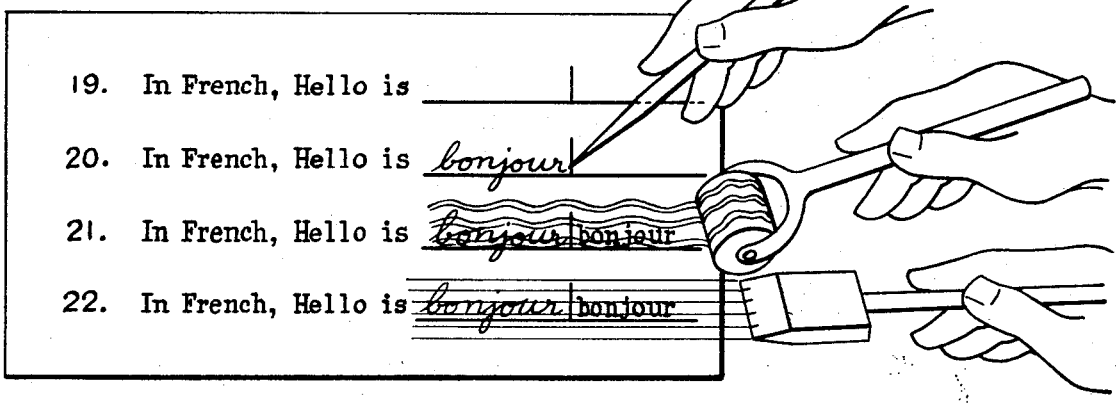
FIG. 8 shows still another embodiment of the invention.

As shown in FIG. 8, the area for student response and the area in which the invisible printing is provided may be horizontally adjacent to one another. For question No. 19 of FIG. 8, the student is obliged to write his response in the area to the left of the vertical visible line as shown in example 20. He then swabs both areas in a continuous stroke to develop the invisible printing and to treat his answer in such a way as to make clear that he wrote it before applying the developing solution. The applicator is designed to make it very difficult to develop the two areas separately without leaving the evidence that the student has done so. In example 21 of FIG. 8, a rotatable ink applicator mounted on the end of a writing instrument includes a tire tread design. If the "tread" is applied in a single smooth rolling motion, the tread pattern is continuous. If the pattern is not continuous, the teacher will infer that the student developed the invisible correct response before writing his own response. Example 22 of FIG. 8 shows a pen such as a shading pen, which discharges the developing agents selectively, i.e., leaves segments upon which ink will not be discharged freely. The result is a pattern which indicates that the application was made in a single stroke. It would be extremely difficult for the student to develop the invisible correct response, then to write his own response, and to apply the pen to his own response to make a continuous pattern. The horizontal areas for answering and in which the invisible ink is provided may of course be reversed.

The arrangements shown in FIGS. 5–8 have the advantage that the correct response when made visible is not hard to read because of overlap with the response made by the student. For purposes of clarity and ease of correcting one's answers, it is envisaged that students will maintain a separation between the response area and the invisibly printed area. The appropriate areas can be clearly marked. It should also be noted that the embodiment disclosed in FIG. 8 has the advantage that a horizontal arrangement leads to more efficient use in the design of the work sheet.

The invention may be utilized in other modifications. For example, the question or information requiring response need not be written but may be dictated to the student by the instructor or communicated through a recording and player or by television. In such case only the information relating to the response is printed on the worksheet, that is the invisible answer and the printed designation of the area for response.

I claim:

1. A teaching device comprising in combination a worksheet and a writing instrument for use therewith, invisible information imprinted on a predetermined area of said worksheet, said area being normally adapted to display markings which are applied thereto by said writing instrument in a predetermined visual form having a first visual effect, and means for applying a developing composition to said area to render said imprinted information visible, said writing instrument comprising a material which provides said first visual effect when applied to said worksheet and a separate visual effect when applied over said developing composition as previously applied to said worksheet, said developing composition comprising a material effective to alter the surface of said area and display markings which are applied to said surface by said writing instrument subsequent to said developing composition by said separate visual effect which is a form visually discriminable from said first visual effect.

2. The teaching device of claim 1 in which said developing composition forms a film on the worksheet and markings subsequently made thereon by the writing instrument are at least only partially visible.

3. The teaching device of claim 1 in which said developing agent is liquid and includes a coloring agent, and said writing instrument is a colored wax crayon.

4. The device of claim 1 wherein said means for applying a developing composition includes means for applying said developing composition to the whole of said predetermined area in a predetermined geometric pattern.

5. The teaching device of claim 1 wherein said worksheet includes at least two of said predetermined areas normally adapted to display markings which are applied thereto and including invisible information imprinted thereon.

6. The teaching device of claim 5 wherein only one of said areas includes information properly responsive to a posed question.

7. The teaching device of claim 5 wherein at least one of said areas includes information additional to that of a posed question but not properly responsive to said posed question.

8. A teaching device of the character described comprising in combination a sheet of paper having printed thereon visible intelligence denoting an area for written response, said response being made to a question posed to a student, a correct answer printed invisibly in said area, developing means for rendering visible said invisible matter upon contact with said invisible matter, a writing instrument for recording the student's response, said instrument producing one visual indication when applied directly to said sheet and another visual indication when applied to the area treated with said developing means, said one visual indication being visually discriminable from said another visual indication to provide a means for determining the order of application of said developing means and said writing instrument to said area of said paper.

9. The teaching device of claim 8 wherein said sheet of paper includes at least one additional area on said sheet corresponding to a question posed to a student, said additional area including additional information printed in said area with said invisible ink.

10. The device of claim 8 wherein said developing means includes means for applying a developing composition to the whole said area in a predetermined geometric pattern.

11. A teaching device comprising, in combination, a sheet of paper having imprinted thereon visible intelligence denoting a first area for written response to a question posed, a correct answer printed invisibly in a second area adjacent said first area, a writing instrument for providing response in said first area, developing means for said invisible printing including means for applying a developing agent to the whole of said first and second areas in a predetermined geometric pattern, said writing instrument comprising a material which provides a first visual effect when applied to said paper and a separate visually discriminable effect when applied over said developing agent as previously applied to said paper.

12. The device of claim 11 wherein said developing means is a stamp having a pattern thereon for application simultaneously of a developing agent in said pattern to said first and second areas.

13. The device of claim 11 wherein said developing means is a shading pen adapted to provide a pattern of a developing composition to said first and second areas.

14. The device of claim 11 wherein said developing means is a patterned roller applicator adapted to provide a pattern of a developing composition simultaneously to said first and second areas.

15. The device of claim 11 wherein said first and second areas are horizontally adjacent and indicated by visible marking.

16. The device of claim 11 wherein said first and second areas are vertically adjacent and indicated by a visible marking.

17. A teaching device comprising, in combination, a sheet of paper having printed thereon visible intelligence denoting a first area for written response to a question posed, a correct answer printed invisibly in a second area adjacent said first area, a writing instrument for recording a student's response in said first area and developing means for rendering visible said invisible matter, said developing means including at least one pair of visually discriminable elements having predetermined geometric relation upon simultaneous application to said first and second areas, said writing instrument comprising a material which provides a first visual effect when applied to said paper and a separate visually discriminable effect when applied over said developing means as previously applied to said paper.

18. The device of claim 17 wherein said developing means is a stamp having a pattern thereon for application of a developing agent in said pattern simultaneously to said first and second areas.

19. The device of claim 17 wherein said developing means is a shading pen adapted to provide a pattern of a developing composition simultaneously to said first and second areas.

20. The device of claim 17 wherein said developing means is a patterned roller applicator adapted to provide a pattern of a developing composition simultaneously to said first and second areas.

21. The device of claim 17 wherein said areas are horizontally adjacent and indicated by visible marking.

22. The device of claim 17 wherein said areas are vertically adjacent and indicated by visible marking.

23. An improved method of teaching comprising the steps of:
   providing means for making an inquiry,
   providing a worksheet having invisible information imprinted on a predetermined area thereof, said information being at least partially responsive to said inquiry,
   providing means for developing said invisible information within said area,
   providing means for writing visibly within said area in response to said inquiry, said means for writing comprised of a material which provides a first visual effect when applied to said worksheet and a separate visually discriminable effect when applied over said means for developing as previously applied to said worksheet,
   applying said means for writing and said means for developing to said worksheet in an order and,
   detecting the order said means for writing visibly and said means for developing are applied to said area.

* * * * *